United States Patent [19]
Paniagua

[11] 3,971,292
[45] July 27, 1976

[54] PROJECTOR OF FLUID WITH ELECTRIC CHARGE, OF PORTABLE TYPE

[76] Inventor: Juan Garcia Paniagua, C/Alejandrina, 1609, Guadalajara, Jal., Mexico

[22] Filed: Nov. 12, 1974

[21] Appl. No.: 522,775

[52] U.S. Cl. .................................. 89/1 A; 43/112
[51] Int. Cl.² .......................................... F41F 5/00
[58] Field of Search ............ 43/112, 132 R, 132 A; 89/1 A

[56] References Cited
UNITED STATES PATENTS

| | | | |
|---|---|---|---|
| 3,374,708 | 3/1968 | Wall | 89/1 A |
| 3,803,463 | 4/1974 | Cover | 89/1 A |

*Primary Examiner*—Hugh R. Chamblee
*Assistant Examiner*—Daniel J. Leach
*Attorney, Agent, or Firm*—Fleit & Jacobson

[57] ABSTRACT

A double-barrelled pistol for simultaneously projecting two, continuous, parallel streams of conductive fluid. The streams of fluid are held at different electric potentials so that when they impact a target in the form of live prey, such as birds, insects, and the like, an electric circuit is completed causing a current of variable intensity to pass through the prey, either killing or stunning it.

8 Claims, 4 Drawing Figures

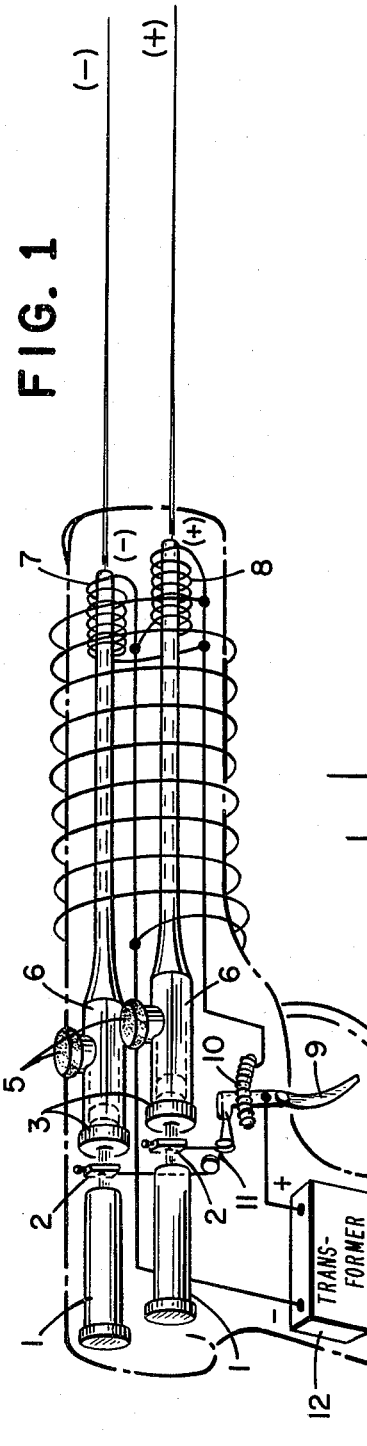
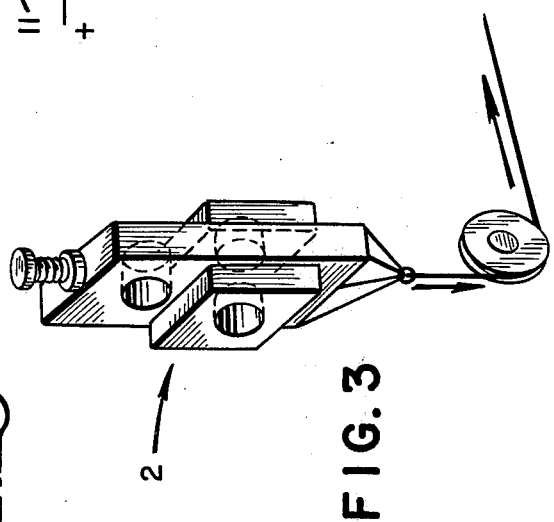
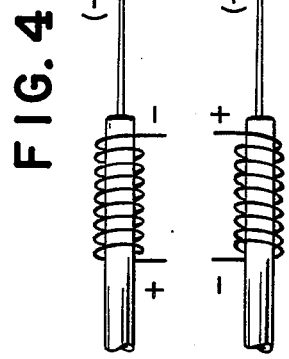

PROJECTOR OF FLUID WITH ELECTRIC CHARGE, OF PORTABLE TYPE

BACKGROUND OF THE INVENTION

The present invention relates to a double-barrelled pistol which simultaneously projects two, continuous, parallel streams of conductive fluid. The two streams carry different electric potentials. Therefore, on impacting a target, in the form of live prey, an electric circuit is completed causing a current to pass through the prey, either killing or stunning it. The severity of effect may be varied by altering the characteristics of the electrical energy, such as the voltage, current, power, frequency, and conductivity of the medium. This may be accomplished by acting on such factors as inductive or capacitive reactances.

The projected fluid may be a gas, liquid or any other conductor of electricity, including, for example, laser or maser beams. Nor is the present invention limited to any particular power source, as either direct or alternating current may be used. In addition, the conductivity of the fluid can be increased by the addition of, for example, ammonium sulfate, different compounds of silver, copper, or the like.

One object of this invention is to provide a portable weapon means with which the different species of agricultural pests, for example, can be killed or stunned.

Another object of the present invention is to provide a simple, versatile, and yet effective, weapon which operates by electricity.

A further object of the present invention is to provide an electrically operated portable weapon whose effective output is readily adjusted by operating on the trigger.

These and other objects of the invention, as well as many of the attendant advantages thereof, will become more readily apparent when reference is made to the following description taken in conjunction with the accompanying drawings.

BRIEF DESCRIPTION OF THE DRAWINGS

FIG. 1 is a view of the inventive pistol;

FIG. 2 is a detail of the trigger, rheostat and the system for opening the valves of the pistol illustrated in FIG. 1;

FIG. 3 is a detail of the valves used in the inventive pistol; and

FIG. 4 is a schematic used to illustrate a principle used in practicing the present invention.

DETAILED DESCRIPTION OF THE DRAWINGS

With reference first to FIG. 1, when trigger 9 of the inventive pistol is squeezed, two forces are set in motion, one mechanical and one electrical. Tension on a pair of cables connected to the top of the trigger 9, through pulley system 11 exerts a force in the direction illustrated in FIG. 3. Biasing springs (not shown), hold the valves 2 illustrated in FIG. 1 in a normally closed position. Pressurized gas, carbon dioxide for example, is contained in replaceable cartridges 1, and is released as valves 2 open. Receptacles 6 contain mercury or any other conductive medium, are filled through openings corked by stoppers 5. When the pressurized gas is released, pistons 4 are forced into the receptacles 6 and the mercury is expelled.

Friction between the pistons 4 and the walls of receptacles 6 can be adjusted, as by a screw, in order to control the flow of the conductive medium. The mercury is projected through medium conduits of non-conductive material. The flow through one conduit becomes negative and that through the other conduit becomes positive by contact with the walls of respective conductive output tubes which are connected to opposite power supply poles through a rheostat 10. Before leaving the device, the mercury receives induction from the energized solenoids 7 and 8, reinforcing the intensity of the electric current developed by the conductive tubes.

In addition to the mechanical projection of the conductive fluid, the trigger also controls the electrical characteristics of the inventive device. A brush on the trigger 9 is attached to the positive pole of the power supply, and makes contact with rheostat 10. As the trigger 9 is pulled harder, the resistance through the circuit drops. The brush connects the power supply, energizing solenoids 7 and 8 and the conductive output tubes.

As illustrated in FIG. 1, the power supply is made up of a transformer 12, which receives current pulses from either a mechanical or electronic vibrator 13 powered by appropriate batteries 14.

FIG. 4 explains the principle of physics which is used in the inventive projector. The two coils 7 and 8 are oppositely wound so that one takes a positive polarity while the other takes a negative polarity. When the mercury from the receptacles 6 is expelled, it passes through the respective coils 7 and 8 and serves as a nucleus, or core, for the electromagnets which are formed by coils 7 and 8. This action increases the field associated with the two expelled streams of mercury, and is controlled by actuation of trigger 9. When the two oppositely charged streams of mercury contact the bird or insect, an electric discharge results.

What is claimed is:

1. A double-barrelled electrical weapon which projects two, continuous, parallel streams of conducting medium and which utilizes a target object to complete an electric circuit through which electrical energy flows, the weapon consisting of: a source of gas under pressure; an actuating mechanism for controlling the discharge of gas from said source; a source of conductive fluid associated with said gas in such a manner that discharge of said gas projects said conductive fluid; first and second non-conductive conduits through which said conductive fluid is projected by said gas; first and second conductive contactors associated with respective said non-conductive conduits, for making electrical contact with the fluid passing through said first and second conduits; an electrical power supply whose poles are connected to respective said first and second contactors so that the conductive fluid propelled from one of said conduits is electrically positive, and the conductive fluid propelled from the other of said conduits is electrically negative; and first and second solenoids, concentric with respective of said non-conductive conduits for reinforcing the polarity and intensity of the electrical energy in said conductive fluid.

2. The device of claim 1, and further comprising first and second solenoids, concentric with respective non-conductive conduits, wound and connected in such a way as to reinforce the polarity and intensity of the electrical energy.

3. The device of claim 1, wherein said fluid medium comprises a base conductor and at least one element or compounds for increasing the conductivity of the fluid, and for providing increased capacity to the projector.

4. The device of claim 1, wherein the streams of fluid are charged by direct current.

5. The device of claim 1, wherein the streams of fluid are charged by alternating current.

6. The device of claim 1, wherein first and second laser rays connected to the positive and negative poles, respectively, of said electrical power supply serve to conduct electrical energy through said target.

7. The device of claim 1, using a single stream of conductive medium to obtain a discharge through targets of different potential with respect to said single stream of conductive medium.

8. The device of claim 1, and further comprising a vibrator for vibrating the electrical energy through said parallel streams of conductive medium.

* * * * *